United States Patent
Perrin et al.

(10) Patent No.: US 10,814,303 B2
(45) Date of Patent: Oct. 27, 2020

(54) PROCESS FOR PRODUCING A CALCIUM PHOSPHATE REACTANT, REACTANT OBTAINED AND USE THEREOF IN THE PURIFICATION OF LIQUID EFFLUENTS

(71) Applicant: SOLVAY SA, Brussels (BE)

(72) Inventors: Patrick Perrin, Barreda Torrelavega (ES); Olivier Jacques F. J. G. Bodson, Duisburg (BE); Thierry Delplanche, Mont-St-Guibert (BE); Dirk Breugelmans, Vilvoorde (BE)

(73) Assignee: SOLVAY SA, Brussels (BE)

( * ) Notice: Subject to any disclaimer, the term of this patent is extended or adjusted under 35 U.S.C. 154(b) by 0 days.

(21) Appl. No.: 15/311,396

(22) PCT Filed: May 18, 2015

(86) PCT No.: PCT/EP2015/060923
§ 371 (c)(1),
(2) Date: Nov. 15, 2016

(87) PCT Pub. No.: WO2015/173437
PCT Pub. Date: Nov. 19, 2015

(65) Prior Publication Data
US 2017/0080401 A1    Mar. 23, 2017

(30) Foreign Application Priority Data
May 16, 2014   (FR) ...................... 14 54383

(51) Int. Cl.
*B01J 20/04*   (2006.01)
*C02F 1/28*   (2006.01)
(Continued)

(52) U.S. Cl.
CPC ........... *B01J 20/048* (2013.01); *B01J 20/041* (2013.01); *B01J 20/043* (2013.01);
(Continued)

(58) Field of Classification Search
CPC ...... B01J 20/041; B01J 20/043; B01J 20/048; B01J 20/28004; B01J 20/28016;
(Continued)

(56) References Cited

U.S. PATENT DOCUMENTS 5,427,754 A   6/1995   Nagata et al.
5,783,217 A   7/1998   Lee et al.
(Continued)

FOREIGN PATENT DOCUMENTS

DE   10330689 A1   2/2005
EP    0261458 A1   3/1988
(Continued)

OTHER PUBLICATIONS

Lester, Heavy metals in wastewater and sludge treatment processes, CRC Press Inc., 1987, p. 2, vol. I.
(Continued)

*Primary Examiner* — Dirk R Bass
(74) *Attorney, Agent, or Firm* — Beatrice C. Ortego

(57) ABSTRACT

A process for producing a calcium phosphate reactant, according to which: in a first step, use is made of a source of calcium and a source of phosphate ions in water, in a molar ratio that is adjusted so as to obtain a Ca/P molar ratio of between 0.5 and 1.6, and the source of calcium is reacted with the phosphate ions at a pH of between 2 and 8, in order to obtain a suspension (A) of calcium phosphate, and in a second step, added to the suspension (A) are an alkaline compound comprising hydroxide ions in order to set a pH of more than 8 and an additional source of calcium in order to obtain a suspension (B) of calcium phosphate reactant having a Ca/P molar ratio of more than 1.6.
A calcium phosphate reactant obtainable by such a process.

11 Claims, 2 Drawing Sheets

(51) Int. Cl.
 B01J 20/28 (2006.01)
 C01B 25/32 (2006.01)
 B01J 20/30 (2006.01)
 C02F 101/20 (2006.01)

(52) U.S. Cl.
 CPC ... *B01J 20/28004* (2013.01); *B01J 20/28016* (2013.01); *B01J 20/28061* (2013.01); *B01J 20/3085* (2013.01); *C01B 25/322* (2013.01); *C02F 1/281* (2013.01); *C02F 2101/20* (2013.01); *C02F 2301/046* (2013.01); *C02F 2303/16* (2013.01)

(58) Field of Classification Search
 CPC ............ B01J 20/28061; B01J 20/3085; C01B 25/322; C02F 1/281; C02F 2101/20; C02F 2301/046; C02F 2303/16
 See application file for complete search history.

(56) References Cited

U.S. PATENT DOCUMENTS

| | | | |
|---|---|---|---|
| 6,013,591 | A | 1/2000 | Ying et al. |
| 7,348,060 | B2 | 3/2008 | Tanaka et al. |
| 8,246,836 | B2 | 8/2012 | Tahon et al. |
| 2006/0013921 | A1 | 1/2006 | Kasahara et al. |
| 2010/0303702 | A1 | 12/2010 | Ogawara |
| 2012/0107373 | A1* | 5/2012 | Shimp .................. A61L 27/425 424/400 |
| 2012/0321573 | A1* | 12/2012 | Karp ..................... A61K 9/0014 424/59 |

FOREIGN PATENT DOCUMENTS

| | | |
|---|---|---|
| EP | 0859737 B1 | 8/1998 |
| EP | 1115654 B1 | 12/2002 |
| EP | 1380313 B1 | 5/2005 |
| FR | 2799193 A1 | 4/2001 |
| FR | 2912396 A1 | 8/2008 |
| FR | 2946037 A1 | 12/2010 |
| WO | WO97/17285 A1 | 5/1997 |
| WO | WO0181249 A1 | 11/2001 |
| WO | WO2013093439 A1 | 6/2013 |

OTHER PUBLICATIONS

ISO 9277:2010 standard (Determination of the specific surface area of solids by gas adsorption)—BET method.

Minh et al, 2012, "Apatitic calcium phosphates: Synthesis, characterization and reactivity in the removal of lead(II) from aqueous solution",Chemical Engineering Journal vol. 198-199, pp. 180-190.

Verwilghen et al(2009) "Convenient conversion of calcium carbonate to hydroxyapatite at ambient pressure" Materials Science and Engineering C 29 pp. 771-773.

* cited by examiner

PROCESS FOR PRODUCING A CALCIUM PHOSPHATE REACTANT, REACTANT OBTAINED AND USE THEREOF IN THE PURIFICATION OF LIQUID EFFLUENTS

CROSS-REFERENCE TO RELATED APPLICATIONS

This application is a U.S. national stage entry under 35 U.S.C. § 371 of International Application No. PCT/EP2015/060923 filed May 18, 2015, which claims priority to French application No. 1454383 filed on May 16, 2014, the whole content of this application being incorporated herein by reference for all purposes.

TECHNICAL FIELD

The invention relates to a process for producing a calcium phosphate reactant. It also relates to the reactant obtained and the use thereof for treating liquid effluents or for treating substances contaminated by heavy metals.

BACKGROUND ART

The problems posed by the impact of heavy metals in the environment are well known. Numerous industrial processes release liquid or gaseous effluents that are heavily loaded with heavy metals, in particular heavy metal soluble salts, such as cationic form salts. The expression "heavy metals" is understood to mean metals whose density is at least equal to 5 $g/cm^3$, and also beryllium, arsenic, selenium, and antimony, in accordance with the generally accepted definition (Heavy Metals in Wastewater and Sludge Treatment Processes; Vol I, CRC Press Inc; 1987; page 2). Lead or cadmium are particularly significant examples, given their harmful effect on the human body. Nickel is another example thereof due to its allergenic effect.

It is thus useful to be able to have reactants capable of absorbing and retaining large amounts of heavy metals for treating industrial liquid effluents or wastewaters originating from treatment plants before the release thereof into the natural environment, or even the treatment of natural aquifer waters, some of which are naturally loaded with heavy metals.

Another example of a problem linked to heavy metals is the combustion of wastes, especially household waste, producing a vaporization of heavy metals, these vapours being entrained in the combustion flue gases. To avoid contaminating the environment, it is necessary to provide flue gas treatment processes capable of carrying out effective scrubbing of heavy metals. The toxic substances removed from the flue gas when it is purified are found in a residue which itself must often be treated before being valorized or discharged. Indeed such residue, which contains the heavy metals removed from the flue gas, when subjected, for example, to the action of rain that is acidic when discharged, frequently releases some of the heavy metals that it contains into the environment. This can then cause pollution of the subsoil. It is therefore essential that the heavy metals be immobilized in the residue.

FR2912396, describes a process for producing a calcium phosphate reactant, according to which a source of calcium carbonate and a source of phosphate ions in water in a weight ratio that is controlled so as to obtain a Ca/P molar ratio of between 1.4 and 1.8 are reacted, at a pH of between 5 and 10, preferably between 7 and 8, with controlled stirring in order to give rise to the appearance of a calcium phosphate gel having a viscosity of at least 200 centipoise (mPa·s). The calcium phosphate reactant obtained by such a process is in the form of particles having a high BET specific surface area of about 130 $m^2/g$.

However, the particles of such a reactant have the drawback of being particularly fine, with weight-average diameters of less than 10 μm, which poses usage problems in sludge blanket treatment of liquid effluents since such particles are easily entrained out of the reactors even at low flow rates of the effluents in decantors, which may give rise to losses of reactants. Moreover, such particles release large amounts of phosphates during their use, which has to be avoided in order to limit the risks of eutrophication of watercourses, since phosphorus is a natural fertilizer that promotes the growth of algae.

DE10330689 discloses granules of hydroxyapatite with particle size between 1 and 5 mm. The document is silent on BET specific surface of such granules. The document discloses a method for purifying a liquid effluent comprising fluor or nickel, in which said granules are put into contact with said liquid effluent in a column, during a time sufficient so that granules adsorb at least part of fluor or nickel. Though, particle sizes of such granules are too important to be correctly used in mixed reactors or in sludge blanket decantors.

SUMMARY OF INVENTION

The invention aims to propose an improved process for producing a calcium phosphate reactant, that makes it possible to obtain an effective reactant for immobilizing heavy metals, in particular in sludge blanket effluent treatment units, and that limits the emissions of phosphates both during the production of the reactant and during the use of the reactant for fixing heavy metals.

Consequently, the invention relates to a process for producing a calcium phosphate reactant, according to which:
  in a first step, use is made of a source of calcium and a source of phosphate ions in water in a molar ratio that is adjusted so as to obtain a Ca/P molar ratio of between 0.5 and 1.6, and the source of calcium is reacted with the phosphate ions at a pH of between 2 and 8, in order to obtain a suspension (A) of calcium phosphate, and
  in a second step, added to the suspension (A) are an alkaline compound comprising hydroxide ions in order to set a pH of more than 8, preferably of more than 8.5, preferably of at least 9, or of at least 10, and an additional source of calcium in order to obtain a suspension (B) of calcium phosphate reactant having a Ca/P molar ratio of greater than 1.6, preferably greater than 1.65.

It has been found that the reactant obtained by the process according to the invention has novel properties. It consists of particles, the mean diameter D50 of which is greater than 10 μm, in general greater than 20 μm, or even greater than 50 μm. However, this mean diameter of the reactant is in general preferably less than 200 μm, or even less than 150 μm. This makes it possible to limit the stirring powers to prevent the particles of reactant from settling too easily in a stirred reactor or from needing high velocities of flue gases to be treated at the injection points of the reactant for the treatment of the flue gases.

Moreover, the reactant from the invention, when made in a first step at low temperature (less than 40° C.), and the second step made at higher temperature (more than 40° C. or of at least 50° C., or of at least 60° C.), has shown particularly high specific surface (at least 110 m²/g, or more) and particular high adsorbtion capacity of metals, and organic molecules.

For comparison, for instance natural apatite found in Maroco have specific surfaces of about 16 m²/g.

The reactant particles of present invention are composed of calcium phosphate, the structure of which is intermediate between tricalcium phosphate and calcium phosphate hydroxyapatite. These particles then evolve very rapidly towards an apatite structure. Such reactant particles are composed on their surface of plate like crystallites, of thickness of a few nano-meters (nm).

It has also emerged that the reactant according to the present invention had a remarkably low solubility of the phosphates contained in the reactant particles. Without wishing to be bound by one theoretical explanation, the inventors believe that this behaviour stems from the fact that during the second step the addition of an alkaline compound comprising hydroxide ions in order to set a pH of more than 8, or of at least 8.5, or even of at least 9, or of at least 10, makes it possible to form, at the surface of the particles of the calcium phosphate reactant, mixed calcium hydroxide and calcium phosphate compounds that actually limit the solubility of the phosphates, for example during treatment of wastewaters having a pH close to neutrality.

DETAILED DESCRIPTION OF INVENTION

Figure 1:
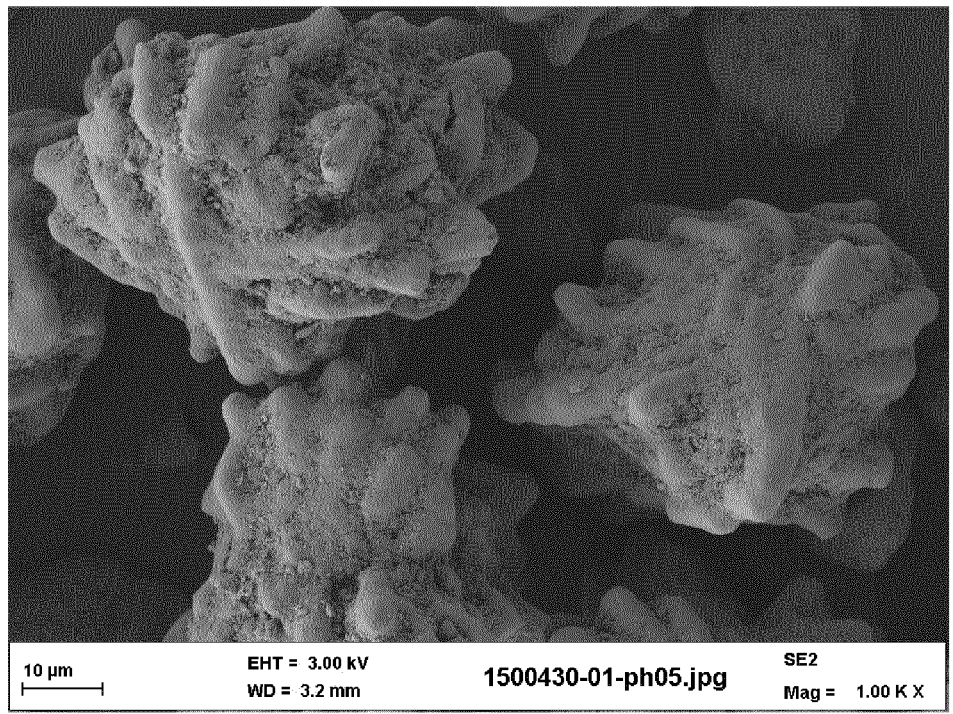
FIG. 1 Is a scanning electron microscope (SEM) picture of reactant particles according the invention at magnification of 1 000.

The particles of calcium phosphate reactant according to the invention in general comprise at least 50% calcium phosphate, advantageously at least 60% and more advantageously still at least 80% calcium phosphate. The balance to 100% in general comprises: water, of the order of from 0 to 20%, advantageously from 5% to 20%, calcium carbonate from 0 to 20%, advantageously from 5% to 20%, calcium hydroxide from 0 to 20%, advantageously from 1% to 4%. The particles of calcium phosphate reactant may additionally contain residual compounds originating from the use of the raw materials in the process such as: $CaCl_2$, $Ca(NO_3)_2$, sands or clays; these constituents are in general less than 5% by weight, advantageously less than 2% by weight.

The term "apatite" denotes a family of mineral compounds, the chemical formula of which can be written in the following general form:

$$Me_{10}(XO_4)_6Y_2$$

In this formula, Me generally represents a divalent cation ($Me^{2+}$), $XO_4$ a trivalent anionic group ($XO_4^{3-}$) and Y a monovalent anion ($Y^-$).

Calcium phosphate hydroxyapatite $Ca_{10}(PO_4)_6(OH)_2$ crystallizes in the space group of the hexagonal system. This structure consists of a close-packed quasi-hexagonal stack of $XO_4$ groups, forming two types of parallel tunnels.

The existence of these tunnels gives apatites chemical properties akin to those of zeolites. Vacancies may also be created either by the departure of anions and cations, or by the presence of cations or anions of different valency. Apatites therefore appear to be particularly stable structures which may tolerate large gaps in their composition.

Hydroxyapatite should not be confused with tricalcium phosphate (TCP), which has a similar weight composition: $Ca_3(PO_4)_2$. The Ca/P molar ratio of TCP is 1.5 whereas it is 1.667 for hydroxyapatite. Industrial apatites sold as food additives or mineral fillers are, as a general rule, variable mixtures of TCP and hydroxyapatite.

Other salts of calcium and phosphate, including TCP, do not have the same properties as hydroxyapatite. Although TCP can also react with heavy metals, hydroxyapatite is more advantageous as it can enclose metals in the form of an insoluble, and therefore relatively inert, matrix.

In the present invention, the source of calcium advantageously comprises calcium carbonate, or calcium oxide, or calcium hydroxide, or calcium chloride, or calcium nitrate, or calcium acetate. The source of calcium is more advantageously a limestone, or a mixture of limestone and calcium oxide or hydroxide. More advantageously, the source of calcium is in the form of powder or aqueous suspension of powder and the powder is selected from: calcium carbonate, calcium oxide, calcium hydroxide, or a mixture thereof, and the powder has a mean particle size of less than 300 m.

It is advantageous for the source of calcium selected from calcium carbonate, calcium oxide, calcium hydroxide or mixtures thereof to be in the form of a powder or aqueous suspension of powder, and to have a small particle size. In one recommended variant, the mean diameter of the particles of the powder is less than 300 μm, advantageously less than 200 μm and preferably less than 100 μm. The mean diameter in question is the D50, that is to say the diameter such that 50% by weight of the particles have a diameter less than said value.

In the present invention, various sources of phosphate ions may be used, in particular:
  phosphoric acid,
  or a dihydrogen phosphate salt such as a sodium, potassium or ammonium dihydrogen phosphate salt, preferably a sodium dihydrogen phosphate salt,
  or a monohydrogen phosphate salt such as a sodium, potassium or ammonium monohydrogen phosphate salt, preferably a sodium monohydrogen phosphate salt.

In the present invention, phosphoric acid is preferred due to its greater availability and lower cost compared to dihydrogen and monohydrogen phosphate salts.

In the process according to the invention, in the first step the Ca/P molar ratio is in particular:
  between 0.50 and 1.35, preferably between 0.70 and 1.30,
  or: between 1.4 and 1.6, preferably between 1.4 and 1.5.

During the first step where calcium and phosphate are used in a Ca/P molar ratio of between 0.5 and 1.6 and where they are reacted at a pH between 2 and 8, the compounds formed in the suspension (A) are a mixture of monocalcium phosphate (MCP) having the weight formula $Ca(H_2PO_4)_2$, of dicalcium phosphate (DCP) having the weight formula $CaHPO_4$, or the hydrate thereof, brushite, having the weight formula $CaHPO_4 \cdot 2H_2O$, and of octacalcium having the weight formula $Ca_8H_2(PO_4)_6 \cdot 6.5H_2O$. The Ca/P molar ratios are respectively for these compounds: 0.5 (MCP), 1.0 (DCP and brushite), 1.33 (octacalcium).

In order to promote, in the first step, the formation of MCP and DCP, a Ca/P ratio of between 0.50 and 1.35, preferably between 0.7 and 1.30, is favoured. This Ca/P molar ratio is particularly advantageous when the source of calcium from the first step comprises calcium carbonate, and the source of phosphate is phosphoric acid ($H_3PO_4$) or is a dihydrogen phosphate salt such as a sodium or potassium or ammonium salt. Specifically, this makes it possible to obtain a rapid attack of the calcium carbonate and a rapid degassing of the $CO_2$. In addition to calcium carbonate, the source of calcium may comprise calcium oxide, or calcium hydroxide, or calcium chloride, or calcium nitrate, or calcium acetate.

In order to promote, in the first step, the formation of DCP and octacalcium, a Ca/P ratio of between 1.4 and 1.6, preferably between 1.4 and 1.5, is favoured. This molar ratio is advantageous when use is made of a source of calcium having less than 30% by weight of carbonate, such as preferably: calcium oxide, or calcium hydroxide, or calcium chloride, or calcium nitrate, or calcium acetate.

In the present invention, in the first step, the source of calcium and the phosphate ions are in general reacted for at least 0.1 hour, preferably at least 0.5 hour. It is not useful to react them over excessively long durations. Advantageously, the source of calcium and the phosphate ions are reacted for at most 4 hours, more advantageously at most 2 hours, or even at most 1 hour. For example, a duration of 1 hour at pH 5 already enables a good reaction of the calcium and the phosphate ions, and makes it possible to sufficiently release the $CO_2$ when a source of calcium comprising calcium carbonate is used, before moving on to the second step.

In the present invention, in the second step, the suspension (B) of calcium phosphate reactant in general has a Ca/P molar ratio of at most 5, preferably of at most 3, more preferably still of at most 2.

In the present invention, it is advantageous, in the second step, for the alkaline compound used, that comprises hydroxide ions, to be sodium hydroxide and/or calcium hydroxide.

In the process according to the invention, it is particularly advantageous for the additional source of calcium to be selected from calcium chloride, calcium nitrate, or calcium acetate, preferably calcium chloride, and for it to be added in addition to the alkaline compound, in order to finely adjust the Ca/P ratio and in order to limit the concentration of phosphorus element in the aqueous solution (C) of the suspension (B) to at most 5 mmol, advantageously to at most 0.5 mmol, more advantageously to at most 0.05 mmol of phosphorus element per litre of aqueous solution (C). Specifically, this makes it possible, coupled with the use of hydroxide ions for setting the pH of the second step, to limit the losses of phosphates in the process waters.

In the present invention, in general, the stirring and the density of suspension, in the second step and advantageously also in the first step, are adjusted in order to avoid the appearance of a calcium phosphate gel having a viscosity of at least 200 cps. The viscosity of the calcium phosphate reactant suspension (B) in the second step of the process of present invention is typically about 10 cps (mPa·s). Specifically, the production of a gel, even in the presence of the second step, results in particles of calcium phosphate reactant of small particle size being produced, with weight-average D50 values of less than 10 μm, which is a disadvantage for certain applications of liquid effluents such as those that use a sludge blanket.

The suspended solids density of the suspension (A) in the first step is in general at most 20%. The suspended solids density of the suspension (B) in the second step is in general at most 15%. The suspended solids density of the suspension (A) and of the suspension (B) is advantageously at least 10%. It has been indeed observed that a too low density of suspension decreases the efficacy of the produced reactant particles in heavy metal adsorption (in particular on Zn, Cu, Ni). Moreover a too low density of suspension induces longer time of water separation when decantation or filtration is used in the process.

In the process of present invention, the stirring of the suspension during the first and second steps corresponds generally to a stirring dissipated energy in the reactors volume of at least 0.2 and at most 1.5 $kW/m^3$, preferably at least 0.5 and at most 1.0 $kW/m^3$.

In a first embodiment of the present invention, the first step is carried out at a temperature of less than 50° C., preferably at most 45° C., or at most 40° C. This makes it possible to obtain a calcium phosphate reactant at the end of the second step in the form of particles of large to medium particle size and having a high specific surface area. The invention relates in particular to a particle of calcium phosphate reactant by this first embodiment, comprising at least 60% by weight of hydroxyapatite, and having a mean size of at least 30 μm, preferably of at least 50 μm and having a specific surface area of at least 50 $m^2/g$, preferably of at least 110 $m^2/g$, and comprising at least 2%, preferably at least 5%, and more preferably at least 6% by weight of hydroxide ions.

In a second embodiment of the present invention, the first step is carried out at a temperature of at least 50° C., preferably of at least 55° C., or of at least 60° C. This makes it possible to obtain a calcium phosphate reactant in the second step in the form of particles of small particle size and having a lower specific surface area. The invention relates in particular to a particle of calcium phosphate reactant obtained by the process according to this second embodiment, comprising at least 60% by weight of hydroxyapatite, and having a mean size of at most 30 μm, preferably of at most 20 μm and having a specific surface area of at least 15 $m^2/g$, preferably of at least 50 $m^2/g$, and having a content of hydroxide ions of greater than 2% by weight, preferably greater than 3.5% by weight, and more preferably greater than 4% by weight.

In the first or second embodiment of the process of the present invention, it is advantageous for the second step to be carried out at a temperature of at least 45° C., preferably of at least 55° C., or of at least 60° C., or of at least 80° C. Specifically, this makes it possible to rapidly convert the calcium phosphate compounds from the first step into the calcium phosphate reactant according to the invention, with a good fixation of the hydroxide ions at the core and at the surface of the calcium phosphate reactant, and to more rapidly consume the phosphates from the solution of the suspension (B). Advantageously, the second step is carried out at a temperature of at least 45° C., preferably of at least 55° C., or of at least 60° C., or of at least 80° C., for a duration of at least 0.1 to 0.5 hour. In general, the addition of the alkaline compound comprising hydroxide ions in order to set the pH of the second step, and of the additional source of calcium in order to obtain a suspension (B) of calcium phosphate reactant having a Ca/P molar ratio of greater than 1.6 last no more than 4 hours, advantageously no more than 2.5 h: at higher temperature such as at 50 or at 60° C. generally one hour is sufficient, as at 40° C. the alkaline compound addition to set the pH of the second step is generally longer: and about 2.5 hours are needed. Preferably, the alkaline compound addition is stopped when the pH remains at the set value for at least 15 minutes. Advantageously, once the additions of hydroxide ions for setting the pH of the second step, and the addition of the additional source of calcium are completed, the suspension (B) is left to cool for 1 to 24 hours, preferably at least 10 hours, down to ambient temperature. This makes it possible to mature the calcium phosphate reactant and to reduce the residues of MCP/DCP or brushite, or of octacalcium (precipitated during the first step), into hydroxyapatite and into calcium phosphate and calcium hydroxide complexes, within the suspension (B).

Optionally, in the process of the present invention, at the end of the second step, the suspension (B) comprises an aqueous solution (C) and calcium phosphate reactant particles, and
  in a third step, a portion of the aqueous solution (C) is separated from the suspension (B) in order to obtain an aqueous suspension (D) comprising at least 18% and at most 50% of calcium phosphate reactant particles, or in order to obtain a wet solid (D') comprising at least 50% and at most 80% of calcium phosphate reactant particles, or a pulverulent solid (D") comprising at least 80% and at most 95% of calcium phosphate reactant particles and at least 5% and at most 20% of water.

Consequently, the present invention also relates to an aqueous suspension (D) comprising at least 25% and at most 50% of calcium phosphate reactant particles obtained by the present process, or to a wet solid (D') comprising at least 50% and at most 80% of calcium phosphate reactant particles obtained by the present process, or a pulverulent solid (D") comprising at least 80% and at most 95% of calcium phosphate reactant particles obtained by the present process and at least 5% and at most 20% of water.

The calcium phosphate reactant obtained according to the present invention is effective for treating substances contaminated by metallic and/or non-metallic elements, in particular contaminated by heavy metals. Consequently, the present invention also relates to a method for purifying a substance contaminated by metallic and/or non-metallic elements according to which the substance, such as waters, gases, flue gases, solid residues or soils, is brought into contact with the calcium phosphate reactant obtained according to the process of the present invention, in particular with the calcium phosphate reactant of the present invention, or with the suspension (D) or the wet solid (D') or the pulverulent solid (D") of the present invention, in order that at least one portion of the metallic elements of the substance is adsorbed by the calcium phosphate reactant.

In the purification method according to the invention, the contaminated substance may be a flue gas containing metallic and/or non-metallic elements such as As, B, F, Se, and according to which the calcium phosphate reactant, or the aqueous suspension (D) or the wet solid (D') or the pulverulent solid (D"), is dispersed in the flue gases, the flue gases being at a temperature above 100° C., the resulting mixture then being subjected to a separation in order to obtain a resulting solid and a flue gas partially purified of metallic and/or non-metallic elements.

In the purification method according to the invention, the contaminated substance may be a liquid effluent containing metallic elements such as: Al, Ag, Ba, Be, Ce, Co, Cd, Cu, Cr, Fe, Hg, La, Li, Mo, Ni, Pb, Pd, Rb, Sb, Sn, Th, Ti, U, V, Y, Zn and/or non-metallic elements such as As, B, F, Se, according to which the calcium phosphate reactant or the suspension of calcium phosphate reactant is mixed into the liquid effluent for a sufficient time so that the calcium phosphate reactant absorbs at least a portion of the metallic and/or non-metallic elements and the mixture is subjected to a clarification in order to produce a liquid partially purified of metallic and/or non-metallic elements, on the one hand, and the calcium phosphate reactant loaded with metallic and/or non-metallic elements that is removed. Preferably, the calcium phosphate reactant is used with the liquid effluent in a contact reactor, such as a sludge blanket reactor or a fluidized bed. The contact time between the calcium phosphate reactant and the liquid effluent is in general at least one minute, advantageously at least 15 minutes, more advantageously at least 30 minutes, even more advantageously at least one hour. In one particularly advantageous embodiment of the invention, the liquid effluent is introduced into a sludge blanket contact reactor in which the calcium phosphate reactant is present at a weight concentration of at least 0.5% by weight and in general at most 10% by weight; a liquid is recovered as overflow from the sludge blanket reactor; a flocculant is added to the recovered liquid in order to form a mixture comprising particles of calcium phosphate reactant entrained out of the contact reactor and flocculated; said mixture is then introduced into a settling tank where the mixture is separated into:
  the liquid partially purified of metallic elements and/or of non-metallic elements, and said liquid is recovered as overflow from the settling tank,
  and into an underflow from the settling tank comprising flocculated and settled particles of calcium phosphate reactant recovered as underflow from the settling tank;
and at least one portion of the underflow from the settling tank containing flocculated and settled particles of calcium phosphate reactant is recycled to the sludge blanket contact reactor. The effectiveness of the treatment of metallic elements and/or non-metallic elements may be monitored by comparing the concentrations of the elements upstream (in the liquid effluent) and downstream of the treatment (in the partially treated liquid), for example by an automatic analyser or by sampling and analysis. The calcium phosphate reactant charge of the contact reactor is in general regularly renewed in portions. For example, by partial purging of the calcium phosphate reactant loaded with metallic and/or non-metallic element at the underflow from the settling tank, and by adding fresh calcium phosphate reactant to the contact reactor. Such a process thus ensures a "chemical polishing" of the liquid effluents. The process is particularly advantageous in the case where the liquid partially purified of metallic elements and/or non-metallic elements is then treated in a biological treatment plant producing sewage sludges. This makes it possible to reduce the concentrations of such elements of said sewage sludges and to reutilize them, for example in agriculture or in land development.

In the purification method according to the invention, the contaminated substance may be a solid residue or a soil contaminated by metallic elements such as Al, Ag, Ba, Be, Ce, Co, Cd, Cu, Cr, Fe, Hg, La, Li, Mo, Ni, Pb, Pd, Rb, Sb, Sn, Th, Ti, U, V, Y, Zn and/or non-metallic elements such as As, B, F, Se, according to which the calcium phosphate reactant, or the aqueous suspension (D) or the wet solid (D') or the pulverulent solid (D") of calcium phosphate reactant is injected into the solid residue or the soil in the vicinity of the metallic and/or non-metallic elements for a sufficient time so that the calcium phosphate reactant adsorbs at least a portion of the metallic and/or non-metallic elements.

In particular the present invention relates to the following embodiments:

Item 1. Process for producing a calcium phosphate reactant, according to which:
in a first step, use is made of a source of calcium and a source of phosphate ions in water, in a molar ratio that is adjusted so as to obtain a Ca/P molar ratio of between 0.5 and 1.6, and the source of calcium is reacted with the phosphate ions at a pH of between 2 and 8, in order to obtain a suspension (A) of calcium phosphate, and
in a second step, added to the suspension (A) are an alkaline compound comprising hydroxide ions in order to set a pH of more than 8, preferably of more than 8.5, preferably of at least 9, or of at least 10, and an additional source of calcium in order to obtain a suspension (B) of calcium phosphate reactant having a Ca/P molar ratio of more than 1.6.

Item 2. Process according to the preceding item, in which in the second step the pH is set between 8 and 10.5, preferably between 8.5 and 10.

Item 3. Process according to the preceding items, in which the source of calcium comprises calcium carbonate, or calcium oxide, or calcium hydroxide, or calcium chloride, or calcium nitrate, or calcium acetate.

Item 4. Process according to any one of the preceding items, in which the source of phosphate ions is phosphoric acid.

Item 5. Process according to any one of items 1 to 3, in which the source of phosphate ions is a dihydrogen phosphate salt such as a sodium, potassium or ammonium dihydrogen phosphate salt, preferably a sodium dihydrogen phosphate salt, Item 6. Process according to any one of items 1 to 3, in which the source of phosphate ions is a monohydrogen phosphate salt such as a sodium, potassium or ammonium monohydrogen phosphate salt, preferably a sodium monohydrogen phosphate Item 7. Process according to any one of the preceding items, wherein in the second step, the suspension (B) of calcium phosphate reactant has a Ca/P molar ratio of at most 5, preferably of at most 3, more preferably still of at most 2.

Item 8. Process according to any one of the preceding items, in which, in the first step, the Ca/P molar ratio is:
between 0.50 and 1.35, preferably between 0.70 to 1.30,
or: between 1.4 and 1.6, preferably between 1.4 and 1.5.

Item 9. Process according to any one of the preceding items, wherein the source of calcium is in the form of powder or aqueous suspension of powder and the powder is selected from: calcium carbonate, calcium oxide, calcium hydroxide, or a mixture thereof, and the powder has a mean particle size of less than 300 µm.

Item 10. Process according to any one of the preceding items, in which the stirring and the density of suspension, in the second step and advantageously also in the first step, are adjusted in order to avoid the appearance of a calcium phosphate gel having a viscosity of at least 200 cps.

Item 11. Process according to any one of the preceding items, in which, in the second step, the alkaline compound used that comprises hydroxide ions is sodium hydroxide and/or calcium hydroxide and/or magnesium hydroxide.

Item 12. Process according to any one of the preceding items, in which, in the second step, the additional source of calcium is selected from calcium chloride, calcium nitrate, or calcium acetate, preferably calcium chloride, and is added in addition to the alkaline compound, in order to finely adjust the Ca/P molar ratio and limit the concentration of phosphorus element in the aqueous solution (C) of the suspension (B) to at most 5 mmol, advantageously to at most 0.5 mmol, more advantageously to at most 0.05 mmol of phosphorus element per litre of aqueous solution (C).

Item 13. Process according to any one of the preceding items, in which the first step is carried out at a temperature of less than 50° C., preferably of at most 45° C., more preferably of at most 40° C.

Item 14. Process according to any one of items 1 to 12, in which the first step is carried out at a temperature of at least 50° C., preferably of at least 55° C., more preferably of at least 60° C.

Item 15. Process according to any one of the preceding items, in which the second step is carried out at a temperature of at least 40° C., preferably of at least 45° C., more preferably of at least 55° C., even more preferably of at least 60° C., or of at least 80° C.

Item 16. Process according to any one of the preceding items wherein at the end of the second step, the suspension (B) comprises an aqueous solution (C) and calcium phosphate reactant particles, and
in a third step, a portion of the aqueous solution (C) is separated from the suspension (B) in order to obtain an aqueous suspension (D) comprising at least 18% and at most 50% of calcium phosphate reactant particles, or to obtain a wet solid (D') comprising at least 50% and at most 80% of calcium phosphate reactant particles, or to obtain a pulverulent solid (D") comprising at least 80% and at most 95% of calcium phosphate reactant particles and at least 5% and at most 20% of water.

Item 17. Particle of calcium phosphate reactant obtainable by the process according to item 13, comprising at least 60% by weight of hydroxyapatite, and having a mean size of at least 30 µm.

Item 18. Particle of calcium phosphate reactant according to the preceding item comprising at least 70%, preferably at least 75%, more preferably at least 80% by weight of hydroxyapatite.

Item 19. Particle of calcium phosphate reactant according to Items 17 or 18 having a mean size of at least 50 µm.

Item 20. Particle of calcium phosphate reactant according to items 17 to 19 having a specific surface area of at least 50 m$^2$/g, more preferably of at least 110 m$^2$/g, even more preferably of at least 120 m$^2$/g, or of at least 140 m$^2$/g, or at least 160 m$^2$/g.

Item 21. Particle of calcium phosphate reactant according to Items 17 or 19 having a mean size of at most 200 µm, preferably of at most 100 µm, more preferably of at most 70 µm.

Item 22. Particle of calcium phosphate reactant according to items 17 to 21 comprising at least 2%, preferably at least 5%, and more preferably at least 6% by weight of hydroxide ions.

Item 23. Particle of calcium phosphate reactant according to items 17 to 22 covered with plate-like crystallites, and wherein the plate-like crystallites have a thickness of at most 25 nm, preferably of at most 20 nm, more preferably of at most 10 nm.

Item 24. Particle of calcium phosphate reactant according to item 23 wherein the thickness of plate-like crystallites is at least 1 nm, preferably at least 2 nm, more preferably at least 4 nm.

Item 25. Particle of calcium phosphate reactant according to Items 17 to 24 and having a mean size of at least 50 µm.

Item 26. Particle of calcium phosphate reactant according to Items 17 to 25 wherein the solubilized phosphate of 10 g of such particles stirred in 90 mL of water during 24 hours with a lab magnetic barrel, then filtrated on a 0.45 µm nitrocellulose membrane, is less than 10 mg PO4/L of water.

Item 27. Aqueous suspension (D) comprising at least 25% and at most 50% of calcium phosphate reactant particles according to item 17 to 26, preferably obtainable from the process of item 16.

Item 28. A pulverulent solid (D") comprising at least 80% and at most 95% of calcium phosphate reactant particles according to item 17 to 26 and comprising at least 5%, preferably at least 6%, more preferably at least 10%, even more preferably at least 15% of water, advantageously obtainable from the process of item 16.

Item 29. A pulverulent solid (D") according to item 28 comprising at most 20% of water.

Item 30. Particle of calcium phosphate reactant obtainable by the process according to item 14, comprising at least 60% by weight of hydroxyapatite, and having a mean size of at most 30 µm, preferably of at most 20 µm and having a specific surface area of at least 15 m$^2$/g, preferably of at least 50 m$^2$/g, and having a content of hydroxide ions of greater than 2% by weight, preferably greater than 3.5% by weight, and more preferably greater than 4% by weight.

Item 31. Method for purifying a liquid effluent containing metallic elements such as: Al, Ag, Ba, Be, Ce, Co, Cd, Cu, Cr, Fe, Hg, La, Li, Mo, Ni, Pb, Pd, Rb, Sb, Sn, Th, Ti, U, V, Y, Zn and/or non-metallic elements such as As, B, F, Se, according to which the calcium phosphate reactant obtained by the process of any one of items 1 to 16 or the calcium phosphate reactant of items 17 to 26, or the aqueous suspension (D) of item 27, or the pulverulent solid (D") of items 28 to 29, is mixed into the liquid effluent for a sufficient time so that the calcium phosphate reactant absorbs at least a portion of the metallic and/or non-metallic elements and the mixture is subjected to a clarification in order to produce a liquid partially purified of metallic and/or non-metallic elements, on the one hand, and the calcium phosphate reactant loaded with metallic and/or non-metallic elements that is removed.

Item 32. Purification method according to item 31, in which the calcium phosphate reactant or the aqueous suspension (D), or the pulverulent solid (D") is used with the liquid effluent in a sludge blanket contact reactor;

with a contact time between the calcium phosphate reactant and the liquid effluent of at least 15 minutes;

and in which said sludge blanket contact reactor, the calcium phosphate reactant is present at a weight concentration of at least 0.5% by weight;

a liquid is recovered as overflow from the sludge blanket reactor;

a flocculant is added to the recovered liquid in order to form a mixture comprising particles of calcium phosphate reactant entrained out of the contact reactor and flocculated;

said mixture is then introduced into a settling tank where the mixture is separated into:

the liquid partially purified of metallic elements and/or of non-metallic elements, and said liquid is recovered as overflow from the settling tank, and into an underflow from the settling tank comprising flocculated and settled particles of calcium phosphate reactant recovered as underflow from the settling tank;

and at least one portion of the underflow from the settling tank containing flocculated and settled particles of calcium phosphate reactant is recycled to the sludge blanket contact reactor.

Item 33. Purification method according to items 31 or 32, wherein the clarification comprises the use of an anionic polyacrylamide, preferably anionic polyacrylamide of molecular weight from $5.10^6$ to $20.10^6$ dalton and from 2 to 50% anionicity in mole %, or more preferably anionic polyacrylamide of molecular weight of $5.10^6$ to $15.10^6$ dalton and from 5 to 15% anionicity in mole %.

Item 34. Purification method according to items 31 or 32, wherein the clarification comprises the use of an anionic modified starch, preferably derived from: potato starch, or corn starch, or tapioca starch.

Item 35. Method for purifying a liquid effluent containing organic compounds such as organic compounds present in black waters from an $H_2O_2$ manufacturing process, in particular: Phthalic acid, 4-tertiary amyl phthalic acid, 4-secondary amyl phthalic acid, Amylphtalic acid derivatives, Aromatic compounds, 4-tertamyl anthraquinone (TAQ), 4-sectamyl anthraquinone (SAQ), according to which the calcium phosphate reactant obtained by the process of any one of items 1 to 16 or the calcium phosphate reactant of items 17 to 26, or the aqueous suspension (D) of item 27, or the pulverulent solid (D") of items 28 to 29, is mixed into the liquid effluent for a sufficient time so that the calcium phosphate reactant absorbs at least a portion of the organic compounds and the mixture is subjected to a clarification in order to produce a liquid partially purified in organic compounds, on the one hand, and the calcium phosphate reactant loaded with organic compounds that is removed.

The examples, the description of which follows, serve to illustrate the invention.

In these examples the pH measurements were made using a WTW Sentix 41 electrode (pH 0-14, temperature: 0° C.-80° C.), a pH meter WTW pH3110. The calibration of the equipment was made using three buffer solutions: at pH 4.0 (batch Dulco test-0032) Prominent, a WTW pH 7.0 (WTW D-82362) and at pH 10.01 Hach (cat 27702). Note: If multiple sample measurements were to be made with the same electrode, the electrode was rinsed with deionized water between each measurement.

The measurement of the residual water was performed using an infrared analyser Ref MA150C from Sartorius. For this, 10 to 20 g of product are dried at 105° C. till a constant weight is obtained during at least 5 minutes.

The particle size measurement was carried out on a Beckman Coulter LS 230 laser diffraction particle size analyser (laser of wavelength 750 nm) on particles suspended in water and using a size distribution calculation based on Fraunhofer diffraction theory (particles greater than 10 µm) and on Mie scattering theory (particles less than 10 µm), the particles being considered to be spherical.

The BET specific surface area was determined by gas adsorption on a Micromeritics ASAP2020 machine. Before the analysis, the samples (0.7 to 1 g) are pretreated under vacuum at 250° C. until a stable vacuum of 4-5 µbar has been achieved. The measurements were carried out using nitrogen as adsorbent gas at 77° K via the volumetric method, according to the ISO 9277:2010 standard (Determination of the specific surface area of solids by gas adsorption—BET method). The BET specific surface area was calculated in a relative pressure (P/P0) range varying from around 0.05 to 0.20.

In the examples, the heavy metal contents of the substances in the solid state were measured in the following manner. A sample of the substance to be analysed (around 200 mg) had 1 ml of 65% Suprapur nitric acid and 3 ml of 37% Suprapur hydrochloric acid added to it, then it was subjected to microwave radiation in a hermetically-sealed container in order to mineralize it (destruction of the (hydro) carbon matrix in order to obtain a mineral residue containing the analytes). This solution, with the addition of an internal standard (scandium) was made up to volume (50 ml) with ultrapure water. The solution to be analysed was then filtered if necessary (0.45 μm) and injected in the form of an aerosol into an argon plasma sustained by inductive coupling. At temperatures of 6000 to 8000° K, the atoms and ions formed from the sample were excited and returned to the ground state by emitting radiation with wavelengths characteristic of the element in the UV/visible range (130 nm to 800 nm) (ICP OES).

The various radiation wavelengths were separated by diffraction on a grating having a large number of lines and the intensity of the chosen lines was measured. The concentration of the target elements in the measurement solution was obtained after calibrating the instrument with solutions of known concentrations of each of the target elements. The concentration of these elements in the starting sample was then calculated taking into account the dilution performed during the various preparation steps.

In the examples, the metal activity test (also called metal trapping activity or metal adsorption activity) is measured according the following operating procedure: An activity test needs at least 1 litre of stock solution; for this: Prepare more than one litter stock solutions of 200 mg/l of the metal to be tested (for Cu, Ni Zn, the following soluble metal salts may be used respectively: $CuSO_4.5H_2O$, $NiCl_2$, $ZnCl_2$), measure the initial metal concentration with spectrophotometric kits hach-lange after a dilution of 50 times (ref: Cu-LCK329, Ni-LCK337, Zn-LCK360). Measure the dry matter (DM) of apatite by using an infrared analyser type MA150C by Sartorius. Introduce the apatite, equivalent 100% dry matter, (respectively 1 g DM for zinc activity, 1.5 g DM for copper activity and 5 g DM for nickel activity) in bottles of 1 liter, filled with 1 liter of the corresponding stock solution. Shake the bottles for 3 hours at 10 rpm, with a lab rotating machine (such as the ones used on TCLP test). Sample 10 ml of the solution with a syringe and filter it with a Millipore filter (0.45 μm), recover the filtrate into a test tube. Take precisely 1 ml of solution in the test tube and perform a precise dilution of 50. Residual metals concentration are analyzed with spectrophotometric kits hach-lange (ref: Cu-LCK329, Ni-LCK337, Zn-LCK360). After correction of dilution factors, the quantity of adsorbed metal is calculated by difference of the initial concentration and the residual one.

Example 1

In Accordance with the Invention 500 g of limestone in powder form having a D50 of less than 300 μm are dispersed in 2469 ml of water at a temperature of 20° C. 646 g of phosphoric acid ($H_3PO_4$) having a weight concentration of 75% are added to this suspension, over a duration of 20 minutes using a peristaltic pump. This addition is accompanied by a temperature increase of 13° C. The mixture continues to be stirred vigorously using a stirrer having 4 inclined blades at 700 rpm (power dissipated by the stirrer of the order of 1 $kW/m^3$), ensuring a good mixing of the sources of calcium and phosphate ions, and making it possible to degas the carbon dioxide formed during the addition of acid. At the end of the addition of acid, the suspension is then heated to 60° C. Once the suspension is at this temperature, a 25 wt % suspension of $Ca(OH)_2$ (244 g of $Ca(OH)_2$ suspended in 732 g of water) is added using a peristaltic pump in order to maintain the pH of the suspension at 10±0.5 for 60 minutes. Once the 60 minutes have passed, the heating is stopped and the stirring is continued but reduced to 50% rotational speed and the suspension is left to cool for about 10 hours until it returns to ambient temperature (22° C.).

The calcium phosphate reactant particles of the suspension have, as composition: 94% by weight of hydroxyapatite, 5% by weight of calcium carbonate, and comprising 3.5% of hydroxide ions. The physical characteristics of the calcium phosphate reactant particles obtained are given in Example 3.

Example 1a

In Accordance with the Invention 500 g of limestone are dispersed in 2469 ml of water at 50° C. 646 g of (75%) $H_3PO_4$ are then added to this suspension, over 20 minutes using a peristaltic pump. The mixture continues to be stirred vigorously at 700 rpm (1 $kW/m^3$) using a 4-blade stirrer, enabling the mixing of the compounds and making it possible to degas the carbon dioxide formed during this step. At the end of the addition of acid, the mixture is stirred for 30 minutes. A 25 wt % suspension of $Ca(OH)_2$ (250 g of $Ca(OH)_2$ suspended in 750 g of water) is then added using a peristaltic pump in order to maintain the pH at 10±0.5 for 60 minutes. Once the 60 minutes have passed, the heating is stopped and the stirring is continued but reduced to 50% of its power and the suspension is left to cool for about 10 hours until it returns to ambient temperature (22° C.).

The calcium phosphate reactant particles of the suspension have, as composition: 95% by weight of hydroxyapatite, 4% by weight of calcium carbonate, and comprising 3.6% of hydroxide ions. The physical characteristics of the calcium phosphate reactant particles obtained are given in Example 5.

Example 1b

In Accordance with the Invention

Calcium phosphate reactant particles were prepared in the same conditions as the ones of example 1, except at the end of the addition of acid, the suspension is then heated to 50° C., and once the suspension is at this temperature, the 25 wt % suspension of $Ca(OH)_2$ is added to maintain the pH of the suspension at 9±0.5 for 60 minutes. Once the 60 minutes have passed, the heating is stopped and the stirring is continued but reduced to 50% rotational speed and the suspension is left to cool for about 10 hours until it returns to ambient temperature (22° C.) as example 1.

The calcium phosphate reactant particles of the suspension have, as composition: 94% by weight of hydroxyapatite, 5% by weight of calcium carbonate, and comprising 3.5% of hydroxide ions. The final density of solid suspension in aqueous suspension (B) was 18% in weight (solid weight reported to total weight of the aqueous suspension). The physical characteristics of the calcium phosphate reactant particles obtained are given in Example 6.

Example 1c

In Accordance with the Invention

Influence of the solid suspension density during the manufacturing process. Calcium phosphate reactant particles were prepared in the same conditions as the ones of example 1b, except that the final density of solid suspension in the slurry targeted and achieved was 5% by weight, and for this an initial quantity of water used was 14205 mL (and not 2469 mL).

The calcium phosphate reactant particles of the suspension have, as composition: 94% by weight of hydroxyapatite, 5% by weight of calcium carbonate, and comprising 3.5% of hydroxide ions. The physical characteristics of the calcium phosphate reactant particles obtained are given in Example 6.

Example 1d

In Accordance with the Invention

Influence of mixing energy during the manufacturing process.

Calcium phosphate reactant particles were prepared in the same conditions as the ones of example 1b, except that the reactor was mixed with at a lower rotational speed at 320 rpm (corresponding to a power reported to volume of reactor of P/V: ±0.2 kW/m$^3$) (as in example 1b the rotational speed and energy of mixing reported to the volume of reactor were respectively 700 rpm and 1 kW/m$^3$).

The calcium phosphate reactant particles of the suspension have, a similar chemical composition of the one of example 1b. The calcium phosphate reactant particles have a D50 of 73 µm and a specific surface area of 166 m$^2$/g.

Example 2

In Accordance with the Invention 100 g of limestone are dispersed in 148 ml of water at ambient temperature of 20° C. This suspension is then poured over a solution of 71 g of $NaH_2PO_4$ in 166 ml of water at ambient temperature of 20° C. The mixture continues to be stirred vigorously, enabling the mixing of the compounds and the degassing of the carbon dioxide formed during this step, over 30 minutes.

Once the addition is completed, a solution of 43 g of $CaCl_2.2H_2O$ in 44 g of water is added over 5 minutes in order to convert the soluble phosphates that have not yet reacted. Next, 58 g of a 25 wt % suspension of lime are added with vigorous stirring using a stirrer having 4 inclined blades.

Once the entire suspension of lime has been introduced, the stirring speed is reduced to 50% and the suspension is stirred for 10 hours.

Example 3

In Accordance

The suspension obtained in Example 1 consists of calcium phosphate reactant particles having a D50 of 61 µm and a specific surface area of 110 m$^2$/g suspended in an aqueous solution.

The suspension is then centrifuged in order to obtain a wet solid containing 55%±5% dry matter.

Example 4

In Accordance

The wet solid obtained in Example 3 is then dried in a ventilated chamber at a temperature of 40° C.±5° C. until a solid is obtained that contains 94% dry matter, formed of a powder of particles having a particle size D50 of 61 µm and a specific surface area of 110 m$^2$/g.

Example 5

In Accordance

The suspension obtained in Example 1a is centrifuged in order to obtain a wet solid containing 55%±5% dry matter; the solid is formed of particles having a D50 of 10 µm and a specific surface area of 16 m$^2$/g.

Example 6

In Accordance

The suspensions obtained in Examples 1b & 1c consists of calcium phosphate reactant particles which specific surface area (S BET) and D50 are listed in tab. 1.

The suspensions of examples 1b and 1c where then centrifuged to obtain a wet solid containing 55%±5% dry matter.

TABLE 1

Reactant particles S BET and D50 from examples 1b & 1c.

| Ca/P Reactant | S BET | D(50) |
|---|---|---|
| from example 1b 18% weight | 166 m$^2$/g | 54 µm |
| from example 1c 5% weight | 180 m$^2$/g | 20 µm |

The corresponding calcium-phosphate reactants were evaluated regarding the metal trapping activity for Zn, Cu, Ni. Results are given in table 2. The figures show that even with a higher specific surface obtained at lower density of solid suspension during the manufacturing of the Ca/P reactant, the metal trapping activity of the reactant from example 1c is lower than the activity of reactant from example 1b, showing no interest to lower the density of suspension during steps 1 and 2.

TABLE 2

Reactant particles metal trapping activity from examples 1b & 1c

| | mg metal/g of Ca/P Reactant | | |
|---|---|---|---|
| Ca/P Reactant | Zn | Cu | Ni |
| from example 1b 18% weight | 119 | 128 | 26 |
| from example 1c 5% weight | 103 | 112 | 24 |

Example 7

In Accordance

Impact of Water Content on Metals Trapping Activity

A more important quantity of Ca/P Reactant particles were prepared using same operating conditions as example 1.b but using and increased size of reactor (useful volume of 200 L) and correspondingly increasing the quantity of raw materials. The obtained Calcium phosphate Reactant particles were dried in a ventilated oven with varying drying time so that to obtain four different solids, with four different residual water contents, respectively with: 50%, 17%, 6% and less than 1% residual water. The ability to trap metals (Cu, Ni and Zn), was measured for each obtained solid (wet solid with 50% water content, or pulverulent solid with 17%, 6% or <1% water content). The results are detailed in the table below, expressed in quantity of metal (mg) trapped by quantity of dry Ca/P Reactant (g).

TABLE 3

Reactant particles metal trapping activity from example 7

| Ca/P Reactant | mg metal/ g Ca/P Reactant | | | Activity loss | | |
|---|---|---|---|---|---|---|
| | Zn | Cu | Ni | Zn | Cu | Ni |
| 50% water | 99 | 109 | 20 | — | — | — |
| 17% water | 75 | 86 | 17 | 24% | 21% | 14% |
| 6% water | 81 | 77 | 17 | 17% | 30% | 14% |
| <1% water | 68 | 62 | 14 | 31% | 44% | 29% |

One can clearly observe that calcium-phosphate reactant has a decreased metal trapping activity when dried, and that a Ca/P reactant comprising more than 5% by weight of water (or at least 6% by weight of water) shows limited and acceptable metal trapping activity. As Ca/P reactant comprising 5% by weight of water or less, shows up to 33 to 41% loss of metal trapping activity for Zn and Cu.

Example 8

In Accordance

Impact of Drying Conditions on Metal Trapping Activity

The Ca/P reactant was dried using two different methods, the first one in a ventilated oven at 80° C., the second one at ambient temperature (AT) at about 20 to 22° C., though to obtain the same targeted and obtained residual water content in the solids, respectively about 17 to 20% and about 5 to 6%. Then, their ability to trap metals was checked and evaluated on Zn, Cu, Ni. The results detailed in table 4 and expressed in quantity of metal (mg) trapped by quantity of dry apatite (g) demonstrate that, what is crucial for activity is the residual water content, and not the way the reactant particles are dried.

TABLE 4

Reactant particles metal trapping activity according drying method

| Drying method | water [%] | mg metal/g Ca/P Reactant | | | Activity loss | | |
|---|---|---|---|---|---|---|---|
| | | Zn | Cu | Ni | Zn | Cu | Ni |
| AT | 17 | 75 | 86 | 17 | — | — | — |
| Oven (80° C.) | 20 | 87 | 81 | 17 | 0% | 5% | 1% |
| AT | 6 | 81 | 77 | 17 | — | — | — |
| Oven (80° C.) | 5 | 66 | 70 | 16 | 19% | 9% | 7% | and residual water content of the Ca/P Reactant.

Example 9

Not in Accordance with Present Invention

Comparison of Ca/P Reactant of present invention with apatite from patent application DE10330689A1. Example 3 (on § [0022] and following §) from DE10330689A1 was reproduced as described here after, to determine the specific surface of the reactant obtained, as the document is silent on this characteristic.

In a 5 l reactor, 3 l of water were introduced, then 111 g of $Ca(OH)_2$ was added and maintained in suspension with a 4 blades inclined agitator, providing 0.2 W/l (or $kW/m^3$) of stirring power. 104 g of phosphoric acid at 85% was then added in the reactor in 1 h, using a peristaltic pump. The pH of the reactor, during the addition of phosphoric acid, is maintained at a minimum of 9 with a solution of caustic soda 1M if necessary. Once all the phosphoric acid added and the pH stabilized at about 9, the content of the reactor is filtered through paper filter and dried in an oven at 80° C. for 24 h. As described in DE10330689A1, the obtained solid after 24 h was a block of solid that can be grinded in granules of 1 to 8 mm.

So before drying the product, part of the suspension was sampled in order to characterize the calcium phosphate reactant particles thus synthesized before drying. The reactant particles had a D50 of 30 µm and a specific surface area of 109 $m^2/g$ (see Tab. 5 for a comparison with Ca/P Reactant in accordance to present invention).

By comparison the reactant particles dried in same condition gives a pulverulent powder as the reactant powder of DE10330689A1 when dried gives a compact block.

Figure 2:
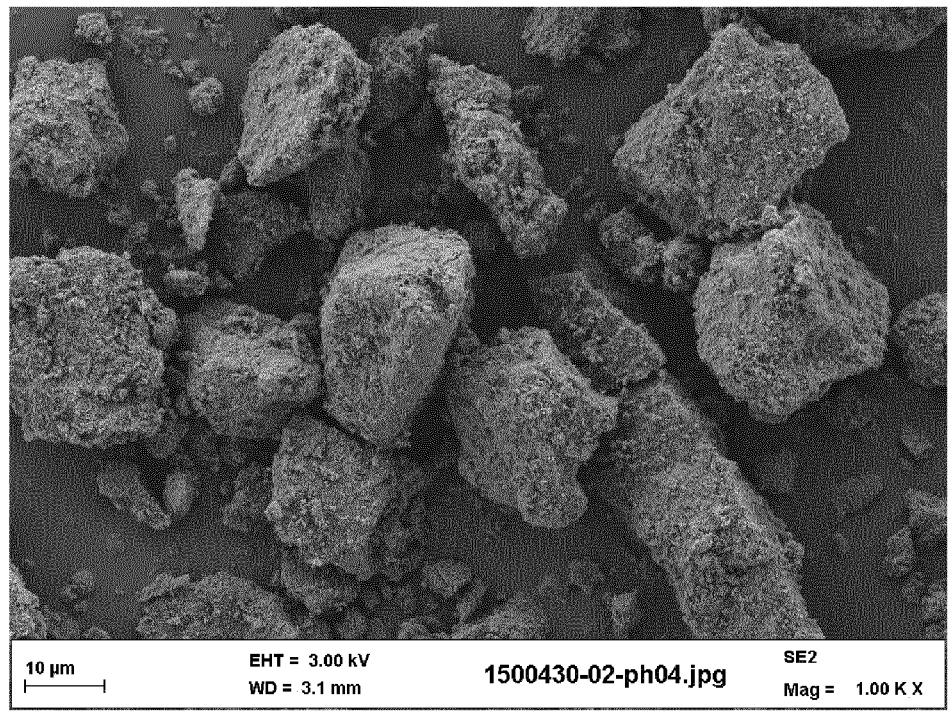
FIG. 2 Is a scanning electron microscope (SEM) picture of reactant particle according DE10330689 document at same magnification as FIG. 1 (of 1 000).
Figure 4:
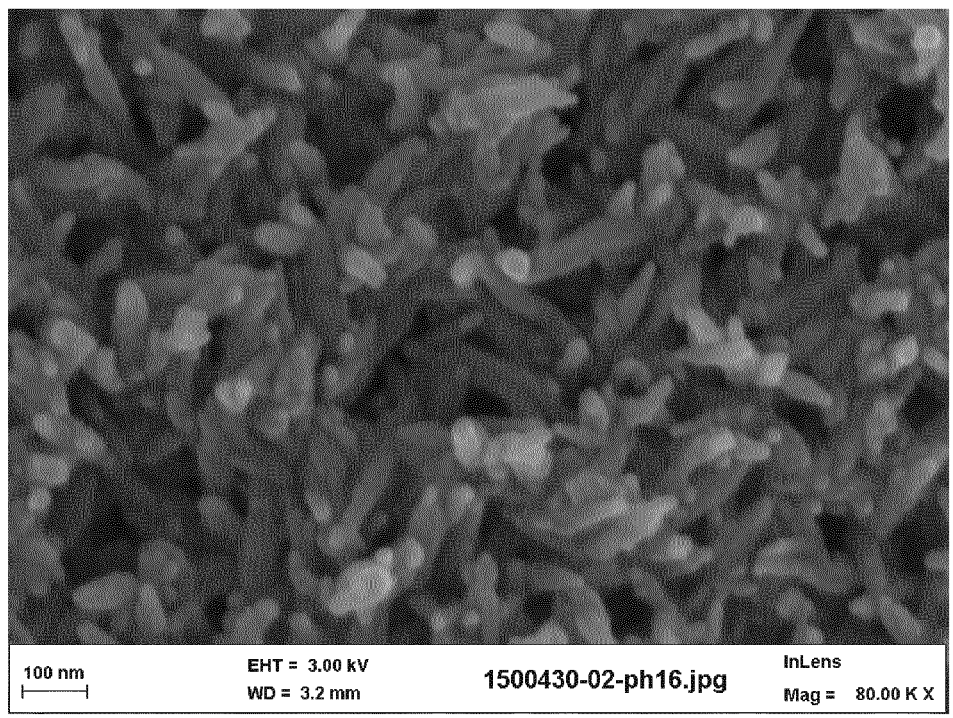
FIG. 4 Is a scanning electron microscope (SEM) picture of reactant particles according DE10330689 document at same magnification as FIG. 3 (of 80 000), showing the surface of reactant particle covered with needles-like crystallites.

Pictures on SEM microscope, given on FIGS. 2 & 4, show that the surface of the obtained reactant particles is covered with needles-like crystallites.

Figure 3:
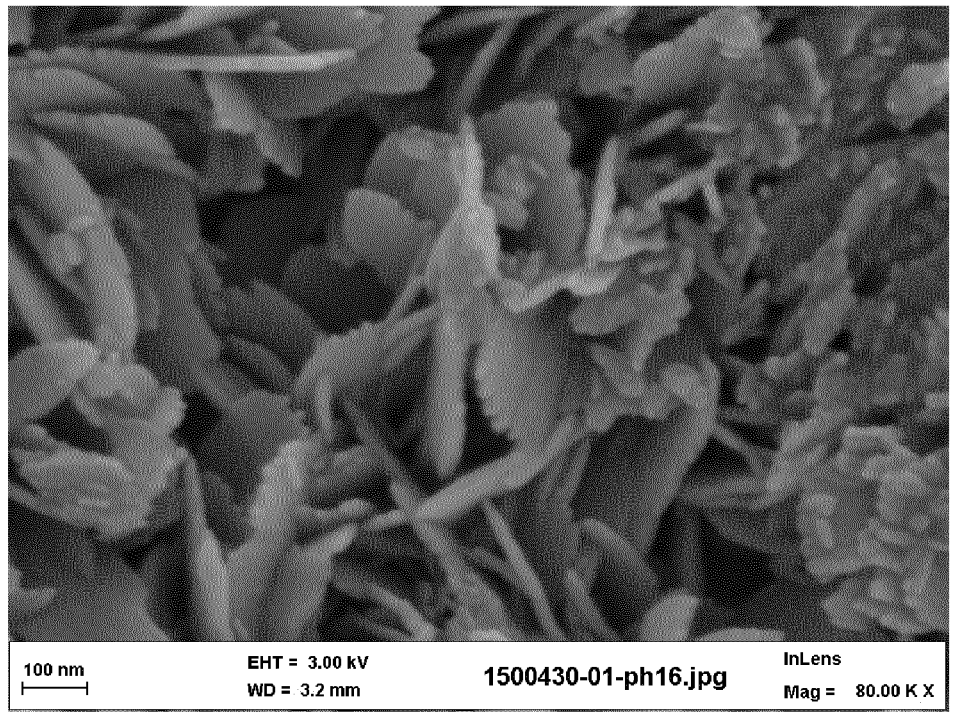
FIG. 3 Is a scanning electron microscope (SEM) picture of reactant particles according the invention at magnification of 80 000, showing the surface of reactant particle covered with plate-like crystallites.

For comparison, pictures on SEM microscope, given on FIGS. 1 & 3, show that the obtained reactant particles from present invention (example 1b) are covered with plate-like crystallites.

TABLE 5

Reactant particles S BET and D50 from example 1b (in accordance with present invention) and from DE10330689A1 (not in accordance).

| Ca/P Reactant | S BET | D(50) |
|---|---|---|
| from example 1b 18% weight | 166 $m^2/g$ | 54 µm |
| from DE10330689 | 109 $m^2/g$ | 30 µm |

Moreover the Reactant particles metal trapping activity from DE10330689A1 (not in accordance) show low values compared to Reactant particles in accordance to present invention: see Tab. 6.

TABLE 6

Reactant particles metal trapping activity from Reactant in accordance with present invention and from DE10330689A1 (not in accordance).

| Ca/P Reactant | mg metal/g Reactant | | |
|---|---|---|---|
| | Zn | Cu | Ni |
| from present invention | 113 | 126 | 25 |
| from DE10330689 | 55 | 56 | 13 |

Also the measure of the solubilized phosphate of the reactant from DE10330689A1 (solubilized phosphate of 10 g of reactant particles stirred in 90 mL of water during 24 hours with a lab magnetic barrel, then filtrated on a 0.45 µm nitrocellulose membrane) is:

14 mg PO4/L for the DE10330689A1 reactant 4 mg PO4/L for typical reactant obtained by present invention.

Example 10

In Accordance

The suspension obtained in Example 1 is used in a 20 litre transparent-walled reactor. The reactor is equipped with a stirrer having 4 inclined blades rotating at around 75 rpm, and the rotation speed of which is adjusted in order to keep the solid in suspension and to form in the reactor a sludge blanket that is visible to the naked eye, occupying 80%±5% of the volume of the reactor, in the bottom part of the reactor. The reactor is fed continuously with liquid effluent at a flow rate of 25 l/h at the base of the sludge blanket reactor. Added to the overflow from the reactor is a flocculant of polyacrylamide type Ref Floerger AN905SH, with a controlled flow rate of the order of 200 ml/h in order to obtain 1 ppm of flocculant with respect to the waters at the outlet of the sludge reactor. The overflow from the reactor and the flocculant supplying the base of a settling tank having a surface area of 0.0154 m² make it possible to obtain a rate of rise of the treated waters of 1.3 m/h. The treated waters are recovered as overflow from the settling tank, and the sludges settled at the base of the settling tank are reintroduced semi-continuously into the sludge blanket reactor with a pump operating at a flow rate of 6 l/h.

Such a process has shown to be effective for at least the following soluble metallic elements: Al, Ag, Ba, Be, Ce, Co, Cd, Cu, Cr, Fe, Hg, La, Li, Mo, Ni, Pb, Pd, Rb, Sb, Sn, Th, Ti, U, V, Y, Zn and/or non-metallic elements such as As, B, F, Se.

Different anionic flocculants of polyacrylamide type (from SNF Floerger: AN905VHM, AN910SH, AN 934, AN 934MPM, AN934SH, AN934VHM, AN945SH, AN977SH, EM532) or of anionic modified starch (Biosourced: Hydrex) from molecular weight from $5.10^6$ to $20.10^6$ dalton and from 2 to 50% anionicity in mole %, or of non-ionic type (from SNF Floerger FA920SH), were tested. The best results are obtained using anionic floccuents such as of polyacrylamide type of $5.10^6$ to $15.10^6$ dalton molecular weight and 5 to 15% anionicity in mole %, or using anionic starch of Hydrex type. Concentration of 1 to 6 ppm in solution, preferably 3 to 5 ppm, gave the best sedimentation time for 2 to 5% dry matter of density of suspension of solids.

Example 11

In Accordance

The solid obtained in Example 4 is used in a fluidized bed, composed of a column, having a diameter of 6 cm and a volume of 2 litres. The fluidized bed is supplied at its base with the aqueous effluent to be treated and with a liquid shuttle (cf. infra).

The calcium phosphate reactant containing apatite is kept in suspension in the fluidized bed by means of a liquid shuttle of 29 l/h produced by a recirculating pump operating on a 3 l buffer tank supplied by the overflow from the fluidized bed. The system ensures a minimum contact time of 15 minutes between the calcium phosphate reactant and the effluent to be treated. A flocculant, of SNF Floerger AN905VHM type, is injected at a flow rate of 120 ml/h into the 29 l/h shuttle before entry into the fluidized bed in order to ensure a concentration of the order of 1 ppm in the aqueous effluent to be treated.

The treated aqueous effluent is extracted by overflow from the buffer reactor at the outlet of the fluidized bed.

Example 12

In Accordance

Example for in-Line Injection:

A tube of 10 m length and 14 mm of internal diameter curved to have 5 portions of 1.8 m length, the remaining length of the tube being the curved sections, is used. 200 l of a synthetic solution containing about 300 µg/l of each of the three metals, Cu, Zn et Ni, is then injected at a flow rate of 50 l/h and an aqueous suspension of 1 l containing 5 g of apatite is co-injected at the beginning of the tube equipment at a flow rate of about 250 ml/h, so that to maintain a contact time of about 1 minute. Samples of treated water solution are analyzed at the outlet of the system and metals concentrations are analyzed with spectrophotometric kits hach-lange (ref: Cu-LCK529, Ni-LCK537, Zn-LCS360). The concentrations of the three heavy metals have been decreased below the quantification of the tests, respectively: 10 µg/l for Cu, 20 µg/l for Zn and 50 µg/l for Ni).

This test shows the excellent reactivity of the Reactant according present invention, even at short contact time of about 1 minute.

Example 13

In Accordance

Example for Organic Molecules Adsorption:

1 l of a solution of Dark effluent waters, from an $H_2O_2$ manufacturing process, was contacted with 50 g of calcium phosphate reactant particles according example 1b, and was stirred with a laboratory magnetic stirrer. A sample of the solution was sampled after one hour of contact with the Reactant particles, filtered through a 0.45 µm membrane and then analyzed by HPLC to assay the remaining compounds. The results of initial organic molecules concentration and final concentrations after contact with the Reactant and filtration are shown on table 7.

TABLE 7

Organic molecules concentration in initial black waters before contact and after one hour of contact with Ca/P Reactant particles and corresponding removal efficacy of said organic compounds.

| Compound | before contact [mg/l] | after 1 h contact and separation [mg/l] | removal efficacy % |
|---|---|---|---|
| Phthalic acid | 42 | 23 | 45 |
| 4-tertiary amyl phthalic acid | 599 | 256 | 57 |
| 4-secondary amyl phthalic acid | 454 | 159 | 65 |
| Amylphtalic acid derivatives | 127 | 57 | 55 |
| Aromatic compounds | 266 | 168 | 37 |
| 4-tertamyl anthraquinone (TAQ) | 1.9 | 0 | 100 |
| 4-sectamyl anthraquinone (SAQ) | 1.8 | 0 | 100 |

Should the disclosure of any patents, patent applications, and publications which are incorporated herein by reference conflict with the description of the present application to the extent that it may render a term unclear, the present description shall take precedence.

The invention claimed is:

1. Particle of calcium phosphate reactant, comprising at least 60% by weight of hydroxyapatite, from 5% to 20% by weight of calcium carbonate, at least 5% by weight and up to 20 wt % by weight of water, said particle having a mean size of at least 30 µm, and having a specific surface area of at least 110 m$^2$/g.

2. A method for purifying a liquid effluent containing metallic elements and/or non-metallic elements comprising: mixing particles according to claim 1 into the liquid effluent to form a mixture for a sufficient time so that the calcium phosphate reactant particles absorb at least a portion of the metallic and/or non-metallic elements; and subjecting the mixture to a clarification to produce a liquid partially purified of metallic and/or non-metallic elements and the calcium phosphate reactant particles which are loaded with metallic and/or non-metallic elements and that are removed.

3. The purification method according to claim 2, wherein the calcium phosphate reactant particles are used with the liquid effluent in a sludge blanket contact reactor;
   with a contact time between the calcium phosphate reactant particles and the liquid effluent of at least 1 minute;
   wherein in said sludge blanket contact reactor, the calcium phosphate reactant particles are present at a weight concentration of at least 0.5% by weight;
   wherein a liquid is recovered as overflow from the sludge blanket reactor;
   wherein a flocculant is added to the recovered liquid in order to form a mixture comprising particles of calcium phosphate reactant entrained out of the contact reactor and flocculated;
   wherein said mixture is then introduced into a settling tank where the mixture is separated into:
      the liquid partially purified of metallic elements and/or of non-metallic elements, said partially purified liquid being recovered as overflow from the settling tank, and
      into an underflow from the settling tank, said underflow comprising flocculated and settled particles of calcium phosphate reactant;
   and
   wherein at least one portion of the underflow recovered from the settling tank and containing flocculated and settled particles of calcium phosphate reactant is recycled to the sludge blanket contact reactor.

4. The particle of calcium phosphate reactant according to claim 1, having a specific surface area of at least 120 m$^2$/g.

5. Particle of calcium phosphate reactant, comprising at least 60% by weight of hydroxyapatite, from 5% to 20% by weight of calcium carbonate, at least 5% by weight of water, said particle having a mean size of at least 30 µm, having a specific surface area of at least 110 m$^2$/g, and being covered with plate-like crystallites, wherein the plate-like crystallites have a thickness of at most 25 nm and of at least 1 nm.

6. The particle of calcium phosphate reactant according to claim 5, comprising at least 6% by weight of water.

7. The particle of calcium phosphate reactant according to claim 5, comprising from 5% to 20% water.

8. The particle of calcium phosphate reactant according to claim 1, further comprising calcium hydroxide.

9. A method for purifying a liquid effluent containing metallic and/or non-metallic elements comprising: mixing particles according to claim 5 into the liquid effluent to form a mixture for a sufficient time so that the calcium phosphate reactant particles absorb at least a portion of said elements; and subjecting the mixture to a clarification to produce a liquid partially purified of said elements and the calcium phosphate reactant particles which are loaded with said elements and that are removed.

10. A method for purifying a liquid effluent containing organic compounds, comprising: mixing the particles according to claim 5 into the liquid effluent for a sufficient time so that the calcium phosphate reactant particles absorb at least a portion of the organic compounds and the mixture is subjected to a clarification in order to produce a liquid partially purified in organic compounds and the calcium phosphate reactant that are loaded with organic compounds and that are removed.

11. The method according to claim 10, wherein the organic compounds are selected from the group consisting of phthalic acid, 4-tertiary amyl phthalic acid, 4-secondary amyl phthalic acid, amylphtalic acid derivatives, aromatic compounds, 4-tertamyl anthraquinone (TAQ), and 4-sectamyl anthraquinone (SAQ).

* * * * *